United States Patent [19]
Coast et al.

[11] Patent Number: 5,811,741
[45] Date of Patent: Sep. 22, 1998

[54] APPARATUS FOR PLACING GEOPHONES BENEATH THE SURFACE OF THE EARTH

[75] Inventors: John B. Coast; Waino J. Kangas, Jr., both of Baton Rouge, La.

[73] Assignee: Coast Machinery, Inc., Rouge, La.

[21] Appl. No.: 820,121

[22] Filed: Mar. 19, 1997

[51] Int. Cl.⁶ .................................................. G01V 1/06
[52] U.S. Cl. ..................... 181/101; 181/0.5; 181/116; 367/191; 175/19; 175/21; 102/313
[58] Field of Search ............................ 181/101, 0.5, 116; 367/191, 178; 175/19, 21, 67; 102/313, 314

[56] References Cited

U.S. PATENT DOCUMENTS

| | | | |
|---|---|---|---|
| 3,242,999 | 3/1966 | Garner | 175/19 |
| 3,752,242 | 8/1973 | Gremillion | 175/108 |
| 3,763,654 | 10/1973 | Matsushita | 61/53.5 |
| 3,777,827 | 12/1973 | Thiery et al. | 175/103 |
| 3,872,932 | 3/1975 | Gosselin | 173/1 |
| 4,492,274 | 1/1985 | Schosek | 175/19 |
| 4,603,748 | 8/1986 | Rossfelder et al. | 175/19 |
| 4,718,048 | 1/1988 | Staron et al. | 367/40 |
| 4,819,740 | 4/1989 | Warrington | 173/49 |
| 5,040,926 | 8/1991 | Andreasson | 405/232 |
| 5,281,775 | 1/1994 | Gremillion | 181/116 |
| 5,301,758 | 4/1994 | Jenne | 175/21 |
| 5,315,074 | 5/1994 | Berquist | 181/0.5 |
| 5,343,002 | 8/1994 | Gremillion | 181/116 |
| 5,355,964 | 10/1994 | White | 173/1 |

*Primary Examiner*—J. Woodrow Eldred
*Attorney, Agent, or Firm*—Pravel, Hewitt, Kimball & Krieger

[57] ABSTRACT

An apparatus for placing geophones beneath the surface of the earth includes a machine frame that supports an elongated probe rod. The probe rod is dimensioned to reach a selected subterranean earth layer. The rod has upper and lower end portions. A geophone holder is positioned at the lower end of the rod for holding a geophone and its cable. A plurality of drive wheels carried by the frame transport the rod between the upper and lower positions. The drive rollers include at least an opposed pair of upper wheels and an opposed pair of lower wheels. The wheels are loaded with an adjustable spring pusher so that extensive pressure can be applied from the drive wheels to the pipe for gripping and driving the pipe even when muddy. A gear train interconnects all of the driving wheels so that all of the wheels rotate at the same rotational speed. A gear train preferably includes six gears including a pair of upper gears, a pair of lower gears, and a pair of intermediate drive gears. The intermediate drive gears are intermeshed so that a single motor rotates one of the intermediate gears and thereby drives all six of the gears of the drive train.

23 Claims, 9 Drawing Sheets

APPARATUS FOR PLACING GEOPHONES BENEATH THE SURFACE OF THE EARTH

BACKGROUND OF THE INVENTION

1. Field of the Invention

The present invention relates to the placement of geophones beneath the surface of the earth and more particularly to an improved powered probe apparatus that burrows into the earth using a pipe or rod having a lower or distal end that carries a socket for holding a geophone. More particularly, the present invention relates to a method and apparatus for placing geophones below the earth's surface using a rod that carries the geophone at its lower end portion wherein the outer surface of the rod is smooth and uninterrupted, and wherein the rod is driven by a series of gear driven drive rollers that are each shaped to grip the outer surface of the pipe and a frame supports the gears, the drive rollers, and wipers that remove dirt and mud from the pipe during operation.

2. General Background of the Invention

Geophones are transducers, used in seismic work, that respond to motion of the ground at a location on or below the surface of the earth. Geophones are typically positioned at intervals beneath the surface of the earth during seismic surveying. Seismologists are often required to place these geophones in subterranean formations beneath marshy, swampy, and like areas. Working in such terrain presents problems. Mechanical equipment can easily break down and become incumbered with the type of unconsolidated clay-like mud that is often at the earth's surface in areas where oil and gas is found.

Some patents have issued that relate generally to the problem of placing geophones beneath the earth's surface.

One example of such a patent is U.S. Pat. No. 3,242,999 issued to R. E. Garner and entitled "METHOD AND APPARATUS FOR POSITIONING GEOPHONES IN SUBTERRANEAN EARTH FORMATIONS". The Garner patent provides a geophone support adaptor having a recess for supporting the geophone and a piston mechanism located immediately above the geophone. After the adaptor has been positioned within the desired earth's stratum, the geophone is expelled from the adaptor by operatively connecting the piston to a fluid reservoir at the surface of the earth. Modifications of the adaptor include a solenoid operated piston mechanism to expel the geophone from the adaptor, and means to rotate the adaptor during its removal through assist in the release of the geophone.

The Gremillion U.S. Pat. No. 3,752,242 entitled "HYDRAULICALLY ACTUATED CAVITY FORMING DEVICE" discusses underground exploration and survey work and the providing of a cavity forming device and the placement of the explosive charges into the cavity formed. The Gremillion '242 patent relates to a device for forming cavities for the introduction of an explosive charge and which includes a pair of rotatably driven stems that are forced downwardly into the ground surface by a hydraulic mechanism which includes a piston and cylinder assembly which is longitudinally extensible and retractable and which is connected with the stems in such a manner to extend and retract the stems longitudinal distance twice the longitudinal extension and retraction of the piston and cylinder assembly.

Another Gremillion patent is U.S. Pat. No. 5,281,775 entitled "VIBRATING HOLE FORMING DEVICE FOR SEISMIC EXPLORATION". In the Gremillion '775 patent, a vibrating hole forming device for seismic explorating is provided in which a vertically elongated mounting pipe with attached rack gears powered vertically by a hydraulically driven pinion gear which will mechanically push the pipe downward into the earth's surface. A vibrating mechanism imparts vibration to the downward force exerted by the pinion gear and rack gear. Vibration is imparted to the pipe automatically when hydraulic pressure required to operate the pinion gear reaches a predetermined pressure such as when the point on the lower end of the pipe encounters a predetermined resistance to further downward movement. This enables the device to penetrate through sands or extremely dense subsurface terrain thereby eliminating the necessity of providing heavy weight vehicle such as is required when conventional hole forming devices are used on which the device is mounted.

Other patents have issued that relate generally to drilling apparatus, underground pipe or cable installation, vibratory earth boring systems, vibratory hammer/extractor devices, and methods of installing piling.

The Thiery et al. U.S. Pat. No. 3,777,827 discloses an apparatus for drilling a bore hole with a drill tool driven in rotation by a motor suspended from the end of a drill column constituted by a flexible drill pipe.

The Gosselin U.S. Pat. No. 3,872,932 discloses a process that comprises progressively increasing the weight on the drill bit, determining the greatest value of the penetration rate of the drill bit during this period, progressively decreasing the weight on the drill bit when the penetration rate has reached a determined value and again progressively increasing the weight on the drill bit when the tension on the drill pipe has reached a fixed value. The passage from a period during which this weight decreased and vice-versa is achieved by varying the linear speed of the drill pipe at the round surface, whereby the tension on the drill pipe is varied.

The Schosek U.S. Pat. No. 4,492,274 relates to a light weight underground pipe or cable installing device adapted to be used in a narrow and deep operating trench. The Rossfelder et al. U.S. Pat. No. 4,603,748 discloses a vibrator system and a method for using a vibrator system to sink pipes or shape equipment. The prior art discussion contained in the '748 patent cites numerous patents and publications that relate in general to earth drilling, the sinking of piles, and pile driving.

The Staron et al. U.S. Pat. No. 4,718,048 discloses a method of locating on drill pipe and ground recordings elementary corresponding to one in the same depth level of the drilling tool, and grouping these elementary recordings in pairs, and then in intercorrelating said recordings of the pairs so as to produce in respect of each pair a correlated signal which is representative of the acoustic energy produced and of the difference in travel times of the waves received on sensors from which the pair of recordings have been obtained.

A vibratory hammer and extractor apparatus is disclosed in the Warrington U.S. Pat. No. 4,819,740.

The Andreasson U.S. Pat. No. 5,040,926 relates to a pile which is intended to take compressive as well as tensile loads or to serve as a reinforcement member in soils. A pile is driven from a roller shaping unit by means of pressure in arbitrary directions into a mass of an earth layer. Upon attainment of the desired depth of penetration and/or pile length the pile is severed at or dose to the upper surface of the earth layer.

A pile driving and/or pulling vibratory assembly with counter weights is disclosed in U.S. Pat. No. 5,355,964 issued to John White.

BRIEF SUMMARY OF THE INVENTION

The present invention relates to an improved method and apparatus for placing geophones beneath the surface of the earth.

The present invention can be mounted on various vehicles that are less intrusive of delicate marsh habitat. Thus, the present invention can be mounted on an airboat, lightweight marsh buggy, small truck, or boat.

The apparatus provides a machine frame and an elongated probe rod or pipe that is dimensioned to reach a selected subterranean earth layer. The rod has upper and lower ends.

A geophone holder is positioned at the lower end of the rod. A plurality of drive wheels are carried by the frame for transporting the rod between upper and lower positions including at least a pair of opposed wheels for frictionally gripping the rod out of surface.

A gear train interconnects and drives the wheel so that all of the wheels rotate at the same rotational speed.

A pusher applies lateral pressure to at least one of the wheels of the opposed pair of wheels for making the compressive force that is generated between the wheels and the rod.

In the preferred embodiment there are two pairs of opposed drive rollers including an upper pair of drive rollers and a lower pair of drive rollers.

In the preferred embodiment, the drive rollers have annular grooves that correspond to and conform generally to the outer surface of the rod which is preferably smooth, uninterrupted and cylindrical.

The gear train comprises of a pair of upper gears, a pair of lower gears, and a pair of intermediate gears positioned in between the pair of upper gears and the pair of lower gears.

The pair of upper gears and connected for rotation to the upper pair of drive rollers while the pair of lower gears are connected for rotation to the lower pair of drive rollers. The apparatus includes a wiper that removes debris from the outer surface of the pipe as the pipe is being moved in between its upper and lower positions. The wipers are preferably spaced a part upper and lower wipers that are positioned respectively above and below the assembly of gears and drive rollers.

BRIEF DESCRIPTION OF THE SEVERAL VIEW OF THE DRAWINGS

For a further understanding of the nature and objects of the present invention, reference should be had to the following detailed description, taken in conjunction with the accompanying drawings, in which like parts are given like reference numerals, and wherein.

DETAILED DESCRIPTION OF THE INVENTION

Figure 1:
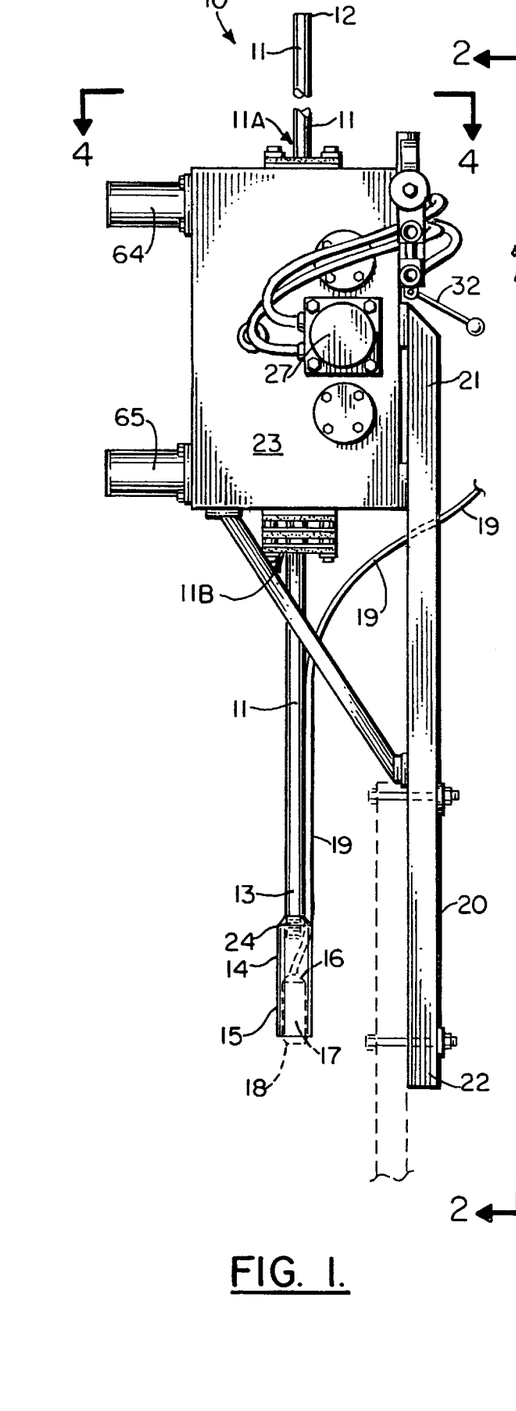
FIG. 1 is a side elevational view of the preferred embodiment of the apparatus of the present invention.
Figure 2:
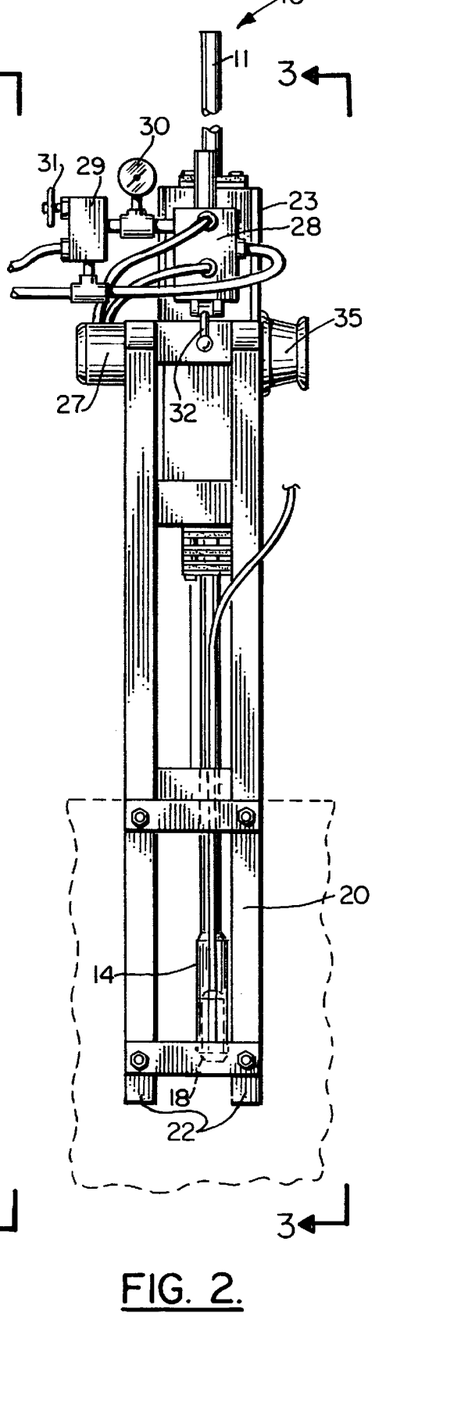
FIG. 2 is a frontal elevational view of the preferred embodiment of the apparatus of the present invention.
Figure 3:
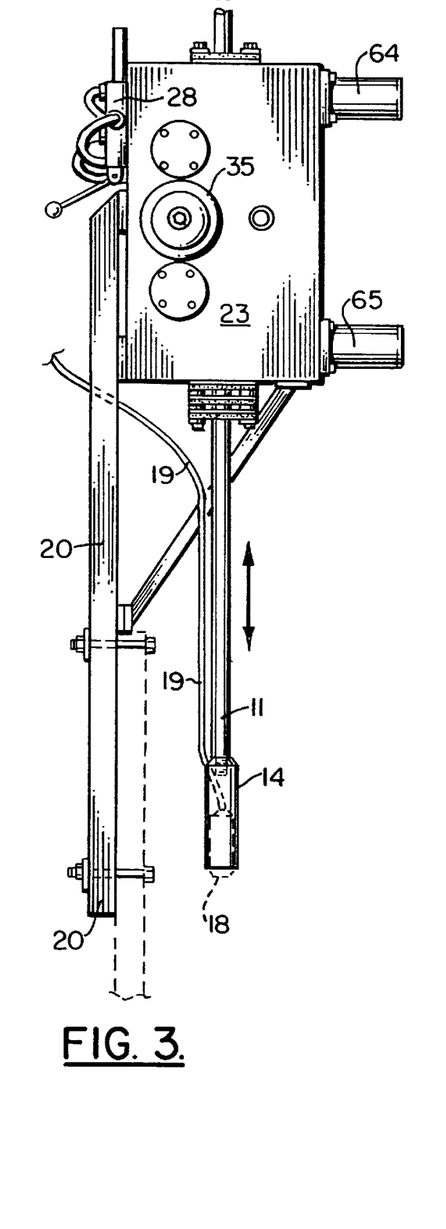
FIG. 3 is a side elevational view of the preferred embodiment of the apparatus of the present invention.
Figure 4:
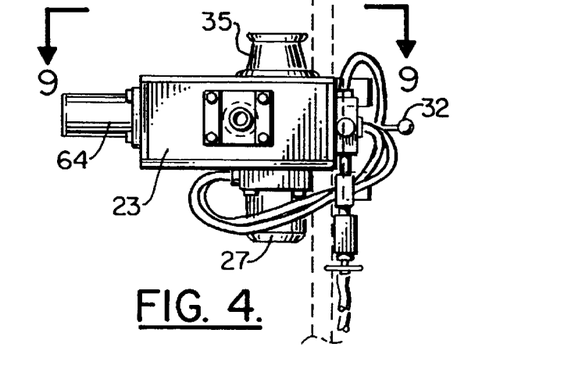
FIG. 4 is a top view of the preferred embodiment of the apparatus of the present invention.

FIGS. 1–3 show generally the preferred embodiment of the apparatus of the present invention designated generally by the numeral 10. Pipe 11 can have a hollow bore 11D. In FIG. 1, the geophone setter apparatus 10 includes an elongated cylindrically-shaped probe rod or pipe 11 having an upper or proximal end 12 and a lower or distal end 13. The distal end 13 carries a geophone holder 14 that has a cylindrically shaped side wall 15 and a circular end plate 16. The side wall 15 and plate 16 surround a cylindrically shaped socket 17 that carries geophone 18 and its cable 19. A channel in geophone holder 14 enables cable 19 to be routed to the exterior of geophone holder 14 as shown in FIG. 1.

A frame 20 supports a plurality of drive rollers. The frame 20 has an upper end 21 and a lower end 22. Lower end 22 of frame 20 can be bolted or otherwise connected to an amphibious marsh craft, airboat, boat, small truck or like vehicle. Upper end 21 of frame 20 includes housing 23. Housing 23 contains a drive mechanism for thrusting pipe 11 into the earth's surface. This drive mechanism is also used to remove pipe 11 after a geophone has been placed. Housing 23 contains the drive mechanism that includes a motor drive, gear train and drive rollers. Openings 11A, 11B as respective wipers 82, 83 (shown on FIG. 6) allow pipe 11 to pass through housing 23.

Figure 5:
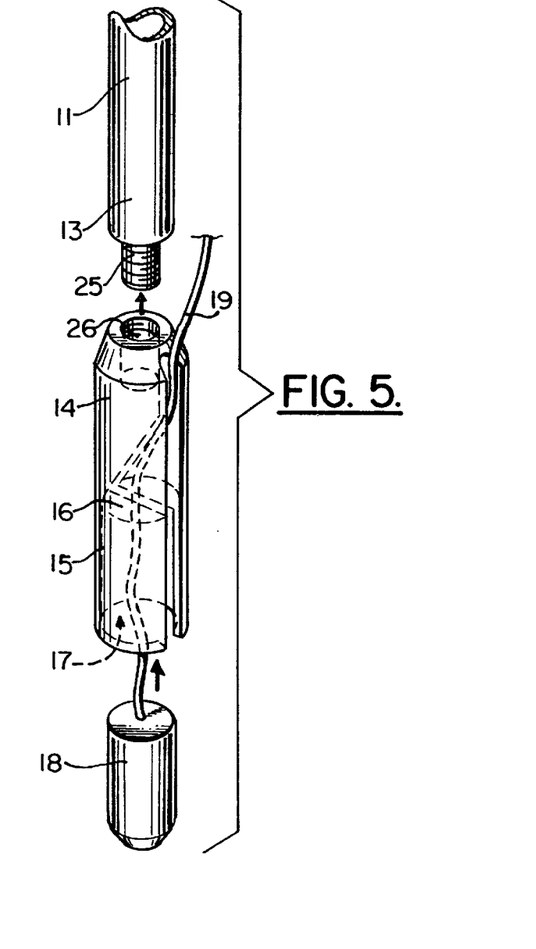
FIG. 5 is a fragmentary perspective view of the preferred embodiment of the apparatus of the present invention.

A threaded connection 24 is formed between the distal end 13 portion of pipe 11 and geophone holder 14. The threaded connection 24 includes an externally threaded portion 25 (FIG. 5) on distal end 13 of pipe 11 and an internally threaded portion 26 on geophone holder 14.

The apparatus 10 of the present invention has a motor drive 27 that is mounted on housing 23. Motor drive 27 cooperates with a four-way control valve 28 and pressure controller 29 to rotate a gear train and drive rollers that thrust the pipe 11 into the earth and withdraw the pipe from the earth after geophone placement is completed. Gage 30 indicates hydraulic pressure during use. Knob 31 on pressure controller 29 is used to regulate the working pressure of hydraulic motor drive 27.

Valve handle 32 is used to actuate motor drive 27. In FIG. 1, an upward rotation of valve handle 32 rotates the hydraulic motor and gear train in a direction that lists pipe joint 11 upwardly. A downward rotation of valve handle 32 rotates hydraulic motor 27 in an opposite direction for thrusting the pipe 11 into the earth during placement of a geophone 18.

Figure 6:
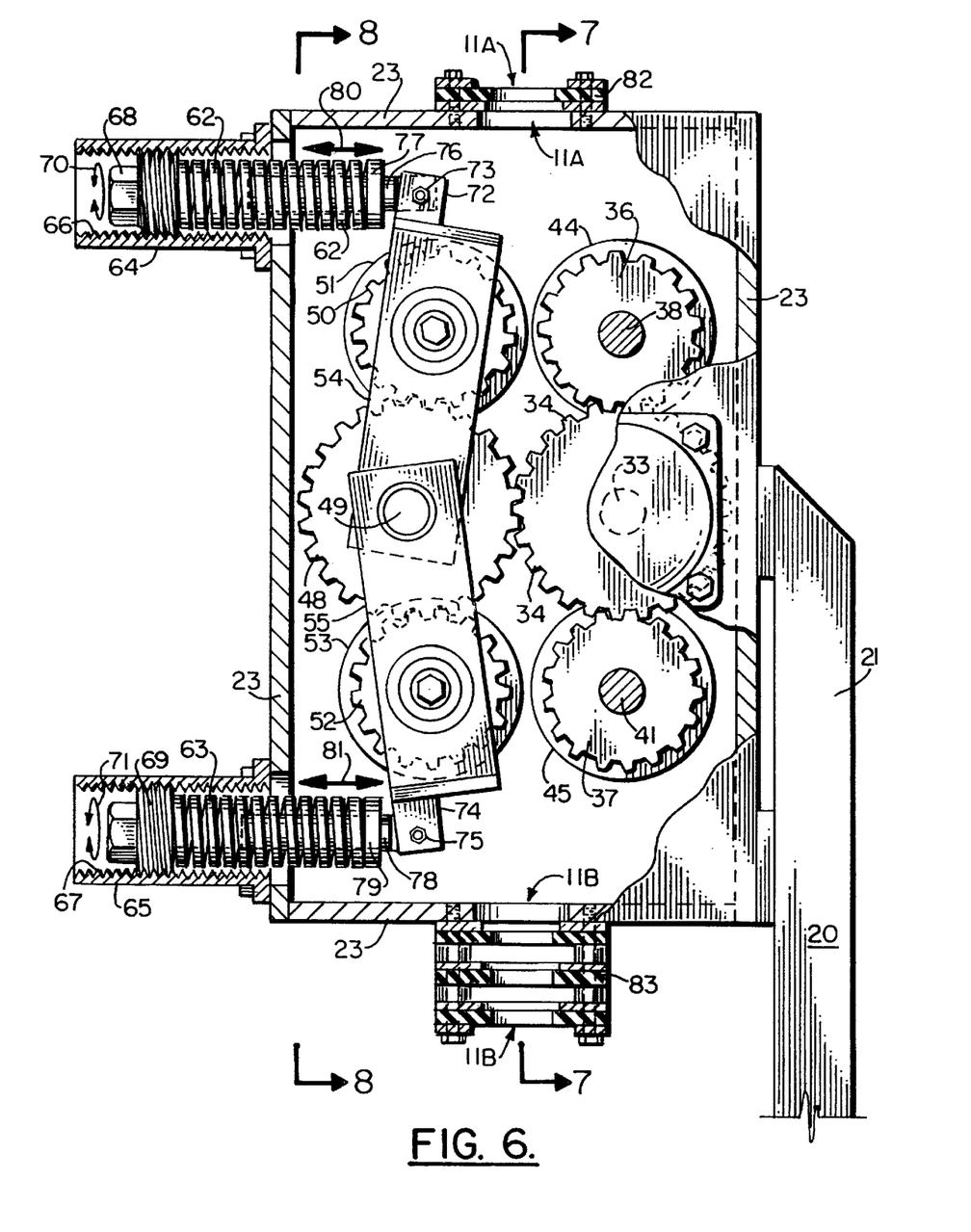
FIG. 6 is a fragmentary sectional elevational view of the preferred embodiment of the apparatus of the present invention illustrating the gear train layout.

In FIGS. 3–9, the construction of housing 23 and its contained drive train and drive rollers is shown more particularly. A drive shaft 33 extends from gear 34. Drive shaft 33 is connected to gear 34 for rotation of capstan 35. Gear 34 rotates with drive shaft 33. A pair of gears 36 and 37 are shown in FIG. 6 positioned respectively above and below gear 34. The gears 36 and 37 intermesh with the gear 34 as shown in FIG. 6 so that when the drive shaft 33 is rotated by motor drive 27, the gears 34, 36 and 37 also rotate.

Figure 7:
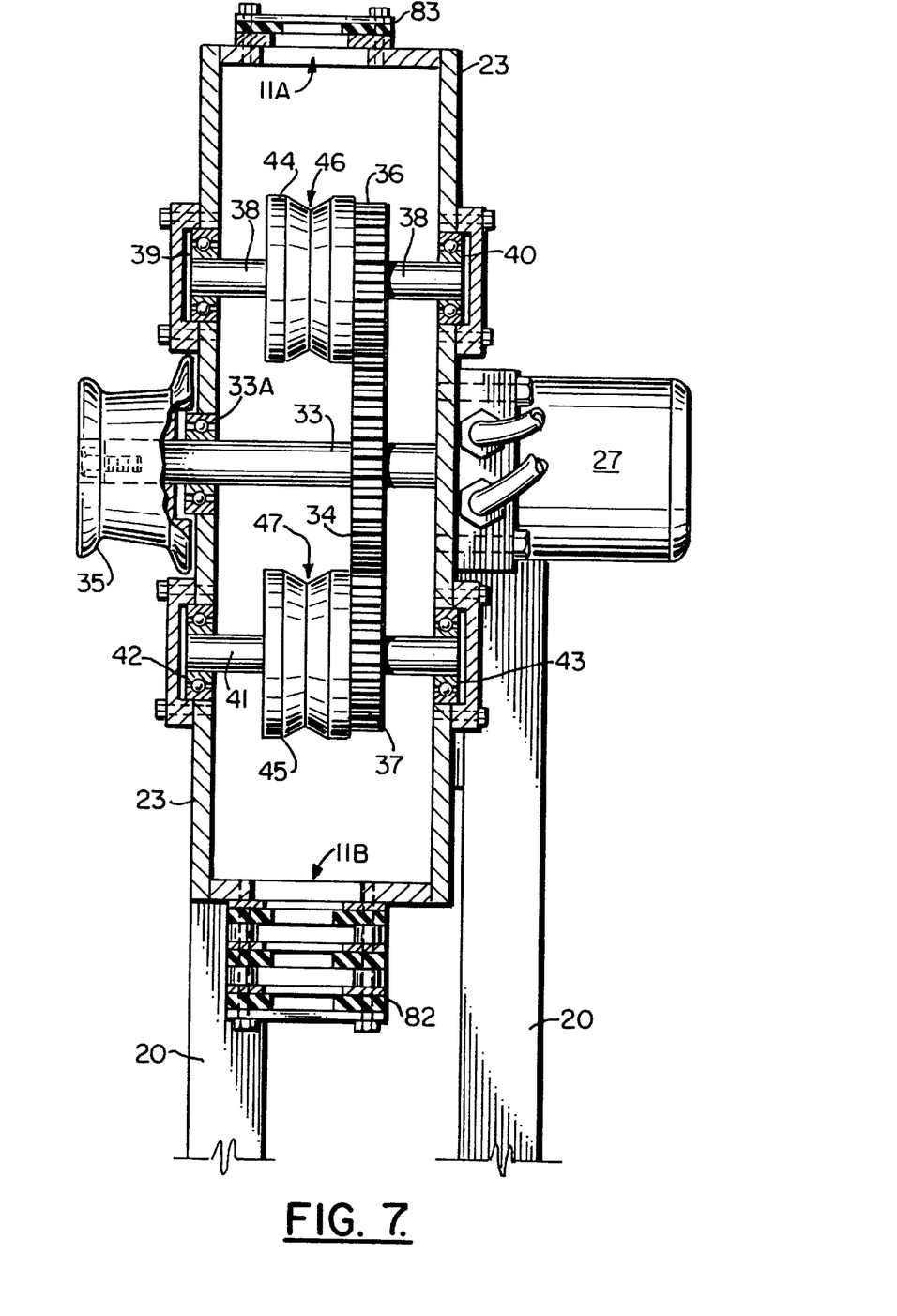
FIG. 7 is a top fragmentary, sectional view of the preferred embodiment of the apparatus of the present invention illustrating the gear train layout, drive rollers and capstan.

Gear 36 is mounted upon shaft 38 which is mounted in bearings 39, 40 (see FIG. 7). The gear 37 is mounted upon shaft 41 that is supported by rotary bearings 42, 43 as shown in FIG. 7. Gear 36 is mounted upon shaft 38. Likewise, drive roller 44 is mounted upon shaft 38 and rotates therewith. In this manner, when the gear 36 and shaft 38 rotate, the drive roller 44 also rotates therewith. Similarly, when the gear 37 rotates with shaft 41, drive roller 45 rotates therewith. Each of the drive rollers 44, 45 provides a respective annular grooved portion 46, 47 that engages the pipe 11 during use. The annular grooved portions 46, 47 are shaped to generally conform to pipe 11, being U-shaped or V-shaped in cross section as shown in FIG. 7.

Figure 8:
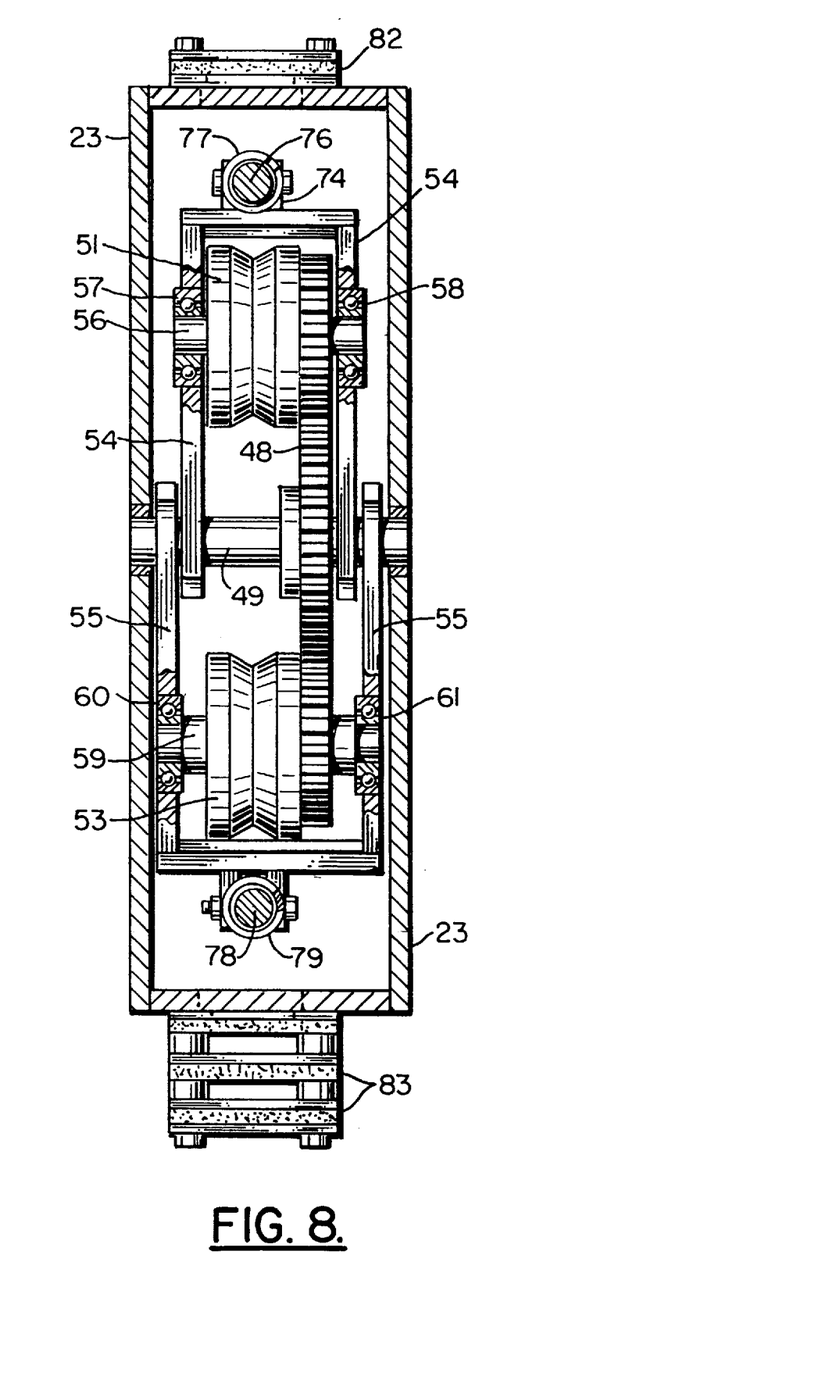
FIG. 8 is a top sectional view of the preferred embodiment of the apparatus of the present invention.

Gear 48 (FIG. 6) is mounted upon shaft 49 and intermeshes with gear 34. Thus when the gear 34 is rotated by motor drive 27 and its drive shaft 33, the gear 48 also rotates upon its shaft 49. A pair of pivoting frames 54, 55 are shown in FIGS. 6 and 8, each pivotally mounted upon shaft 49. The gear 50 is attached to and rotates to roller 51. Gear 52 is attached to and rotates with drive roller 53. The pivoting frames 54, 55 pivot upon shaft 49 so that they can tightly grip the pipe 11 when the pipe 11 is positioned in between the upper rollers 44, 51 and in between the bottom rollers 45, 53. This arrangement is best seen in FIG. 9.

Figure 9:
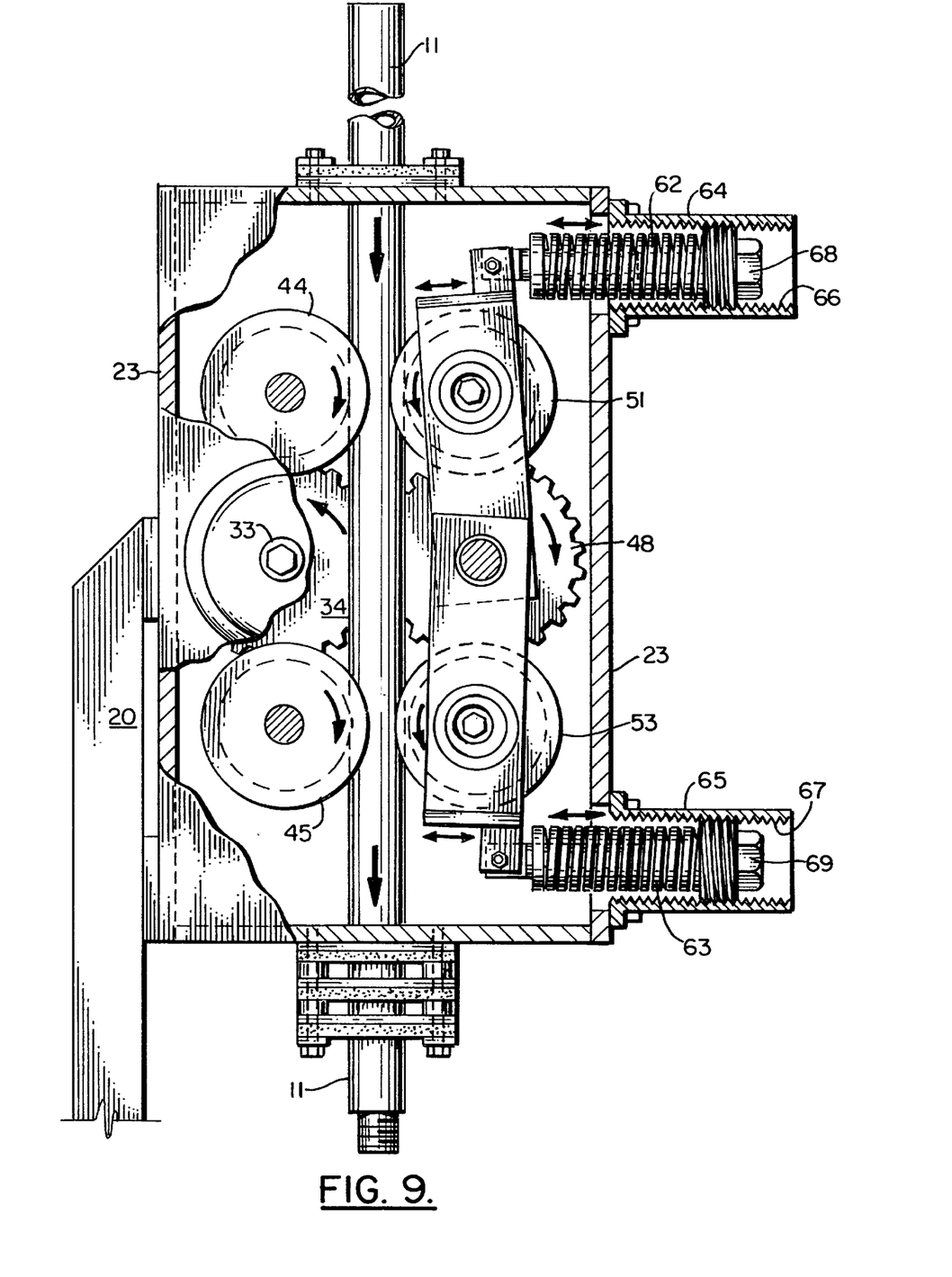
FIG. 9 is a sectional view taken along lines 9—9 of FIG. 4.

In FIG. 9, a thrusting of pipe 11 into the earth's surface is shown showing the relative rotational directions of the drive wheels and associated gears. In FIG. 8 a shaft 56 is used for supporting gear 50 and roller 51 upon pivoting frame 54. The shaft 56 is mounted upon rotary bearings 57, 58. Similarly, shaft 59 carries gear 52 and drive roller 53. The shaft 59 is mounted to pivoting frame 55 with rotary bearings 60, 61.

A pair of springs 62, 63 are used to apply force to each pivoting frame 54, 55 for urging the rollers 51 and 53 into contact with pipe 11 and pressing pipe 1 against rollers 44, 45. In FIGS. 6 and 9, each spring 62, 63 is mounted in a respective housing 64, 65. The housing 64 provides an internally threaded bore 66. The housing 65 similarly provides an internally threaded bore 67.

An externally threaded nut 68 engages the threaded bore 66 of spring housing 64. Externally threaded nut 69 engages the threaded bore 67 of spring housing 65. Arrows 70 and 71 respectively illustrate the rotation of each respective threaded nut 68, 69 relative to its spring housing 64, 65. This rotation of the externally threaded nuts 68, 69 is used to apply greater or lesser pressure to the pipe 11 by rollers 44, 51 and 45, 53.

As each externally threaded nut 68, 69 is rotated in a direction that moves the nut 68 or 69 toward housing 11, this produces more and more compression of springs 62, 63 respectively for applying more and more pressure to pipe 11 via drive rollers 51, 53 as they urge the pipe 11 toward drive rollers 44, 45 respectively.

In FIG. 6, a bracket 72 is attached to the end portion of pivoting frame 54 opposite shaft 59. Bracket 72 enables a pinned connection 73 to be formed between bracket 72 and spring 62. Spring 62 includes a push rod 76 portion that centers the spring 62 as shown in FIG. 6 and a transverse plate 77 that extends away from the push rod 76 for defining an end support for the spring. In this fashion, the spring 62 can be compressed in between threaded nut 68 and transverse plate 77. Similarly, spring 63 is mounted to push rod 78 and transverse plate 79. A pinned connection 75 is formed between bracket 74 and spring 63 at pushrod 78.

Arrows 80 and 81 in FIG. 6 indicate the direction of movement of spring 62 and 63 as compression is applied to or relieved from the springs 62, 63 by externally threaded nuts 68 and 69 as they are rotated in either rotational direction to accomplish more or less compression.

Figure 10:
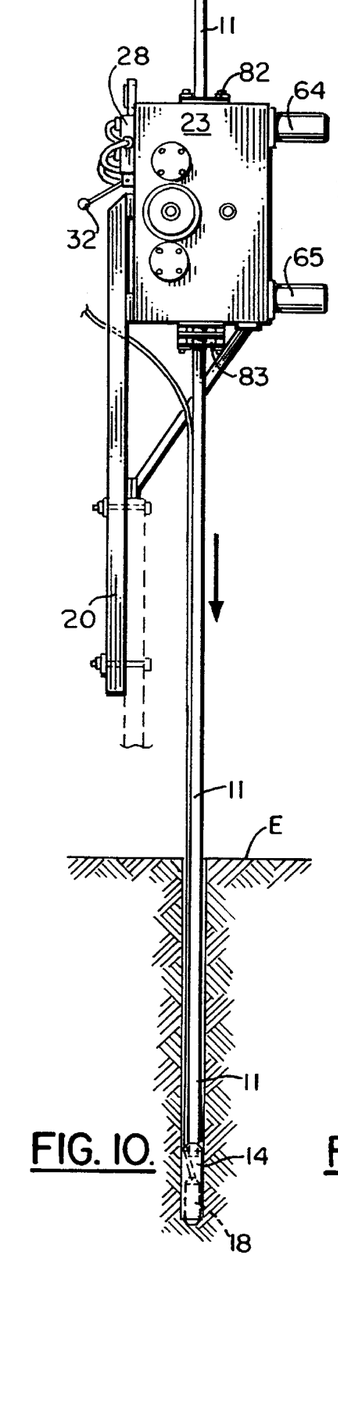
FIGS. 10–12 are sequential elevational view illustrating the method of the present invention.
Figure 11:
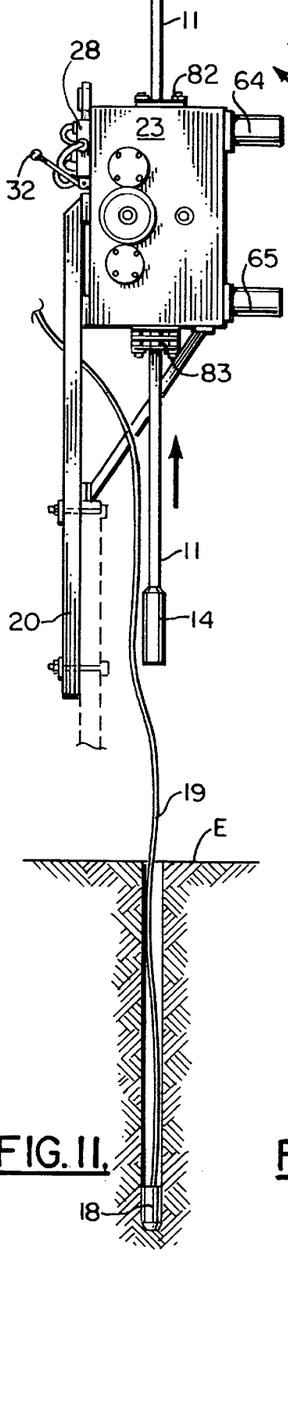
Figure 12:
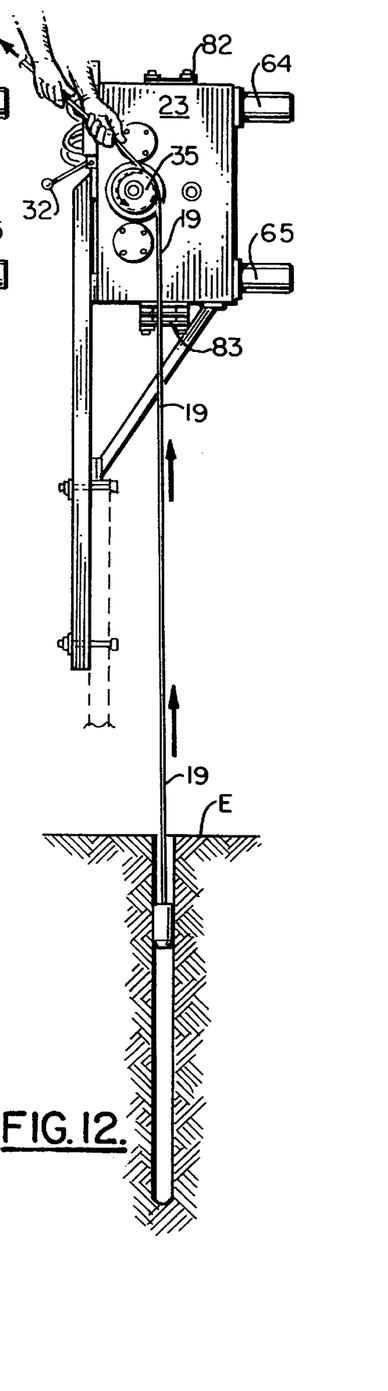

Wiper assemblies 82, 83 are provided for wiping dirt, mud, and the like from the external surface of pipe 11 during use. The upper wiper assembly 82 can be a smaller wiper since most of the debris will be removed by lower wiper 83. The lower wiper 83 in FIG. 6 is comprised of three rectangular rubber plates having circular openings that are slightly smaller in diameter than the external diameter of pipe 11. In this fashion, the rubber wiper assemblies 82, 83 conform tightly to the outside surface of pipe 11 so that when the pipe is lowered or raised, any mud or debris on the outside surface of pipe 11 will be removed by the wipers before it enters the interior of housing 23, thus protecting the gears and drive rollers from mud, debris, et cetera. In FIG. 10, pipe 11 is being thrusted into the earth E. In FIG. 11, pipe 11 is being withdrawn, leaving geophone 18 behind. In FIG. 12, capstan 35 is used to engage cable 19 during removal of geophone 18.

Figure 13:
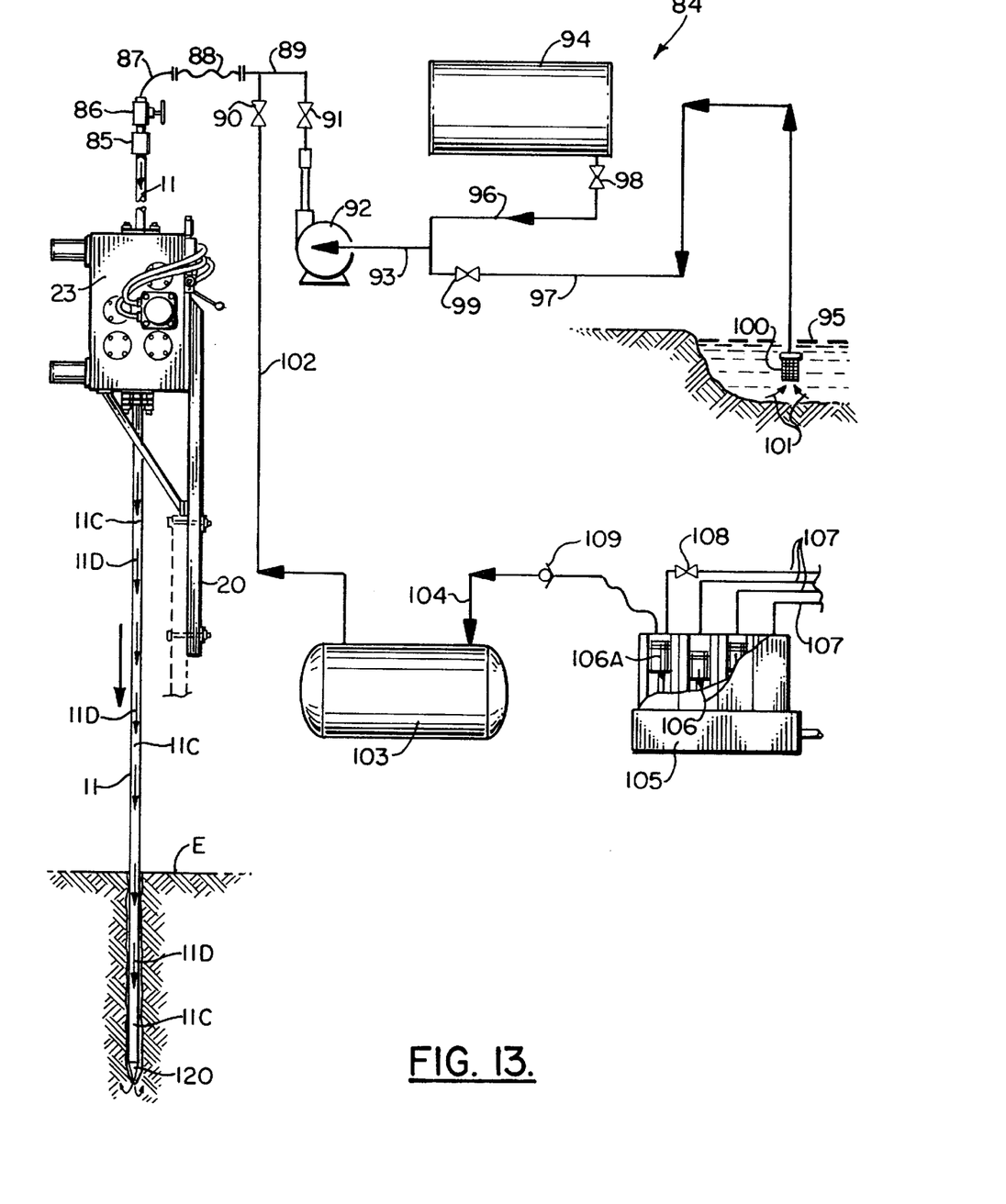
FIG. 13 is a schematic view of a second embodiment of the apparatus of the present invention illustrating a jetting arrangement that is useful in placement of geophones and/or dynamite.

FIGS. 13–17 show a second embodiment of the apparatus of the present invention designated generally by the numeral 84 in FIG. 13. In the embodiment of FIGS. 13–17, fluid is used for jetting to form a borehole. The pipe 11 is used for forming the borehole 118 (FIG. 17) and is then removed from the earth E. A dynamite adapter 110 is then attached to pipe 11 and placed into the borehole 118. The dynamite adapter can use a commercially available hold down tip 1 12 to anchor the dynamite in the borehole 118 at the lower end 119 thereof.

FIG. 13 shows the second embodiment of the apparatus of the present invention and more particularly an overall view showing the fluid jetting arrangement. In FIG. 13, the apparatus 84 includes a frame 20 supporting a housing 23 that includes the motor drive, control valve, drive rollers and the like as described with respect to the embodiment of FIGS. 1–12. Thus, the housing 23 in FIG. 13 is constructed in accordance with FIGS. 1–4, and 6–9.

The upper end portion of pipe 11 has a control valve 86 connected thereto using a connector 85 such as a threaded bushing. A flow line 87 connects to control valve 86 for supplying fluid to pipe 11 via control valve 86. Fluid can be in the form of water such as supplied from reservoir 95 or compressed air as supplied by diesel engine 105 and air tank 103. Pipe 11 provides a hollow internal open ended flow bore 11C. In FIG. 13, flow through pipe 11 is indicated by arrows 11D. A jetting nozzle 120 is at the lower end of pipe 11.

Valves 90 and 91 can be opened or closed as selected by the user to supply either water or air or a combination thereof. Flow inlet line 87 is attached to a flexible hose section 88 for isolating any vibration and/or movement of pipe 11 from spoolpiece 89. Spoolpiece 89 is conventional pipe that is connected to valves 90 and 91. The valves 90 and 91 control respectively the flow of compressed air and water to spoolpiece 89, hose 88, flow line 87, and valve 86.

If the user desires to jet with water, valve 90 can be closed and valve 91 opened. Pump 92 receives fluid (e.g., water) from suction line 93 that is connected to lines 96 and 97. The line 96 receives fluid from a storage tank 94. The line 97 receives water from reservoir 95. Control valves 98 and 99 enable the user to selectively receive water from either tank 94 or reservoir 95. Flow line 97 can provide a filter screen 100 for intaking water from reservoir 95 as indicated by arrows 101 in FIG. 13.

Sometimes, a source of water is not readily available. If the user desires to use compressed air in the jetting operation, tank 103 defines an accumulator for holding compressed air at a desired pressure level. Flow line 102 communicates with pipe spoolpiece 89 so that air flow from tank 103 can flow through line 102 and valve 90 to spoolpiece 89. If only compressed air is to be used in the jetting operation, valve 91 can be closed and pump 92 shut off to eliminate the flow of water to spoolpiece 89. Diesel engine 105 can be used to supply compressed air via line 104 to tank 103. Diesel engine 105 can be a conventional diesel engine having a number of cylinders 106. Cylinder 106A in FIG. 13 can be used for compressing air by placing a control valve 108 in its fuel line 107. Check valve 109 prevents the flow of compressed air from tank 103 to engine 105.

In FIGS. 14–17, dynamite adapter 1 10 is shown more particularly. Dynamite adapter 110 is in the form of an elongated tubular member having upper and lower sections 110A, 110B and that holds one or more sections of dynamite 111 to be activated and fired with cable 117, as shown in FIGS. 14–17. A threaded connection can be used for attaching the lower end of pipe 11 to dynamite adapter 111.

Figures 14, 15:
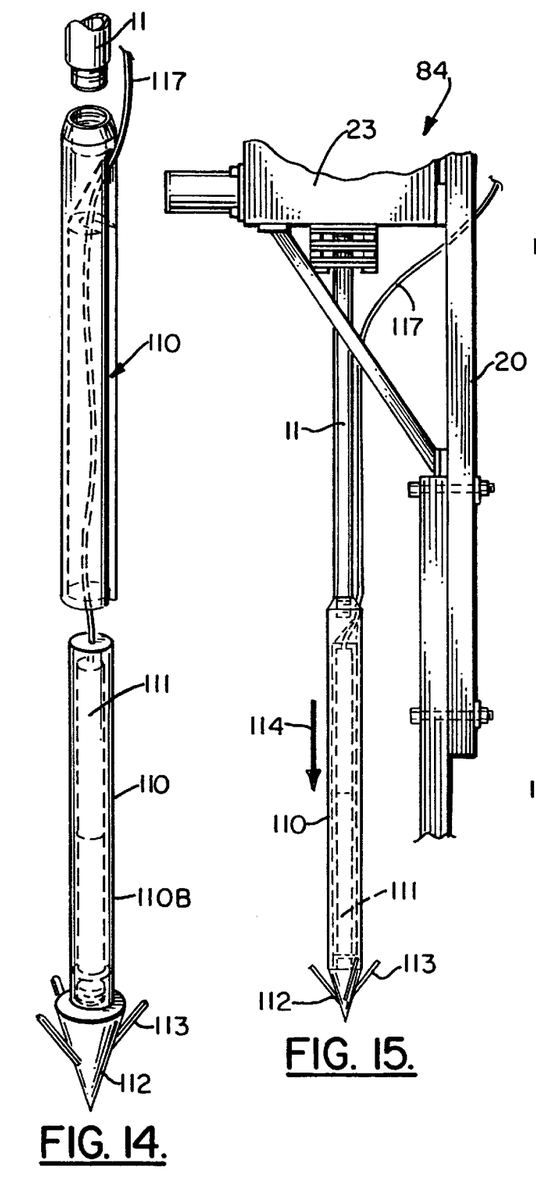
FIG. 14 is a fragmentary perspective view of the second embodiment of the apparatus of the present invention.
FIGS. 15–17 are sequential views that illustrate the placement of dynamite using the method and apparatus of the present invention.
Figures 16, 17:
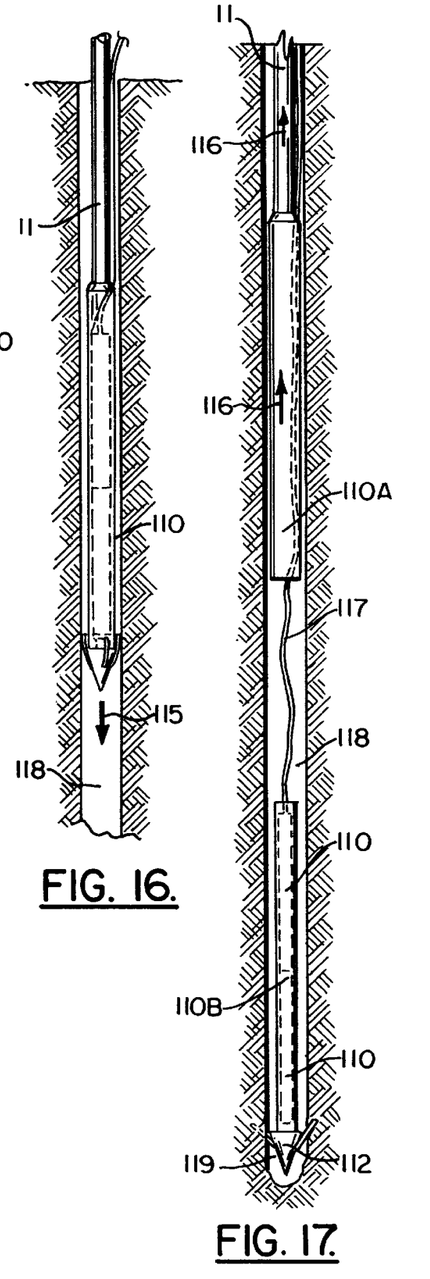

A commercially available hold down tip 112 having anchors 113 can be attached to the lower end of dynamite adapter 110. These hold down tips are commercially available. FIG. 15 illustrates the downward movement of pipe 11 and dynamite adapter 110 containing dynamite 111 and hold down tip 112. In FIG. 16, the pipe 11 and dynamite adapter 110 are shown moving downwardly in borehole 118 that was formed using the jetting apparatus that was shown and described more particularly in FIG. 13. Arrow 115 in FIG. 16 illustrates the downward movement of pipe 11, dynamite adapter 110 in borehole 118.

In FIG. 17, dynamite adapter 110 and its contained charges of dynamite have been placed at the lower end portion 119 of borehole 118. The user then reverses the direction of the drive motor of housing 23 withdrawing pipe 11 as shown by the arrows 116 in FIG. 17. In the embodiment of FIGS. 14–17, the dynamite adapter 110 is in the form of a pair of telescoping sections 110A, 110B that separate when the user withdraws pipe 11 as shown in FIG. 17. The hold down tip 112 retains the lower section 110B of dynamite adapter 110.

The present invention provides an improved system for placing dynamite during seismic exploration with minimal damage to the surrounding environment by the transport vehicle. The frame 20 in FIGS. 13–17 can be attached to relatively lightweight vehicles such as a one or two-man amphibious marsh craft weighing approximately 2,500–5,000 lbs., including airboats, boats, and small trucks for example. The apparatus 10 can be made to weigh as little as 200 pounds and can generate 2,500 pounds of thrust to pipe 11.

The following table lists the parts numbers and parts descriptions as used herein and in the drawings attached hereto.

PARTS LIST

| Part Number | Description |
| --- | --- |
| 10 | geophone placing apparatus |
| 11 | pipe |
| 11A | opening |
| 11B | opening |
| 11C | bore |
| 11D | arrows |
| 12 | proximal end |
| 13 | distal end |
| 14 | geophone holder |
| 15 | side wall |
| 16 | end plate |
| 17 | socket |
| 18 | geophone |

PARTS LIST -continued

| Part Number | Description |
| --- | --- |
| 19 | cable |
| 20 | frame |
| 21 | upper end |
| 22 | lower end |
| 23 | housing |
| 24 | threaded connection |
| 25 | externally threaded portion |
| 26 | internally threaded portion |
| 27 | motor drive |
| 28 | 4 way control valve |
| 29 | pressure controller |
| 30 | gage |
| 31 | knob |
| 32 | valve handle |
| 33 | drive shaft |
| 33A | bearing |
| 34 | gear |
| 35 | capstan |
| 36 | gear |
| 37 | gear |
| 38 | shaft |
| 39 | bearing |
| 40 | bearing |
| 41 | shaft |
| 42 | bearing |
| 43 | bearing |
| 44 | drive roller |
| 45 | drive roller |
| 46 | annular groove |
| 47 | annular groove |
| 48 | gear |
| 49 | shaft |
| 50 | gear |
| 51 | roller |
| 52 | gear |
| 53 | roller |
| 54 | pivoting frame |
| 55 | pivoting frame |
| 56 | shaft |
| 57 | bearing |
| 58 | bearing |
| 59 | shaft |
| 60 | bearing |
| 61 | bearing |
| 62 | spring |
| 63 | spring |
| 64 | spring housing |
| 65 | spring housing |
| 66 | threaded bore |
| 67 | threaded bore |
| 68 | externally threaded nut |
| 69 | externally threaded nut |
| 70 | arrow |
| 71 | arrow |
| 72 | bracket |
| 73 | pinned connection |
| 74 | bracket |
| 75 | pinned connection |
| 76 | pushrod |
| 77 | transverse plate |
| 78 | pushrod |
| 79 | transverse plate |
| 80 | arrow |
| 81 | arrow |
| 82 | wiper assembly |
| 83 | wiper assembly |
| 84 | geophone/dynamite placing apparatus |
| 85 | connector |
| 86 | control valve |
| 87 | flow inlet |
| 88 | flexible hose |
| 89 | pipe spoolpiece |
| 90 | valve |
| 91 | valve |
| 92 | pump |
| 93 | flow line |

-continued

PARTS LIST

| Part Number | Description |
| --- | --- |
| 94 | storage tank |
| 95 | reservoir |
| 96 | flow line |
| 97 | flow line |
| 98 | valve |
| 99 | valve |
| 100 | filter screen |
| 101 | arrows |
| 102 | flow line |
| 103 | air tank |
| 104 | flow line |
| 105 | diesel engine |
| 106 | cylinder |
| 106A | cylinder |
| 107 | fuel line |
| 108 | fuel shut off valve |
| 109 | check valve |
| 110 | dynamite adapter |
| 110A | upper section |
| 110B | lower section |
| 111 | dynamite |
| 112 | hold down tip |
| 113 | anchor |
| 114 | arrow |
| 115 | arrow |
| 116 | arrow |
| 117 | electrical cable |
| 118 | hole |
| 119 | lower end |
| 120 | jetting tip |
| E | earth |

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. An apparatus for placing geophones beneath the surface of the earth, comprising:
   a) a machine frame;
   b) an elongated probe rod dimensioned to reach a selected subterranean earth layer, the rod having upper and lower end, and interchangeable sections;
   c) a geophone holder positioned at the lower end of the rod;
   d) a plurality of drive wheels carried by the frame for transporting the rod between upper and lower positions, including at least a pair of opposed wheels for frictionally gripping the rod outer surface;
   e) a gear train for interconnecting and driving the wheels so that all of the wheels rotate at the same rotational speed;
   f) a pusher that applies lateral pressure to at least one of the wheels of the pair of opposed wheels.

2. The apparatus of claim 1 wherein there are two pairs of opposed drive rollers.

3. The apparatus of claim 1 wherein the two pairs of opposed drive rollers include an upper pair of drive rollers and a lower pair of drive rollers.

4. The apparatus of claim 1 wherein the drive rollers have annular grooves that conform generally to the outer surface of the rod.

5. The apparatus of claim 3 wherein the gear train comprises a pair of upper gears, a pair of lower gears and a pair of intermediate gears positioned in between the pair of upper gears and the pair of lower gears.

6. The apparatus of claim 5 wherein the pair of upper gears are connected for rotation to the upper pair of driver rollers.

7. The apparatus of claim 5 wherein the pair of lower gears are connected for rotation to the lower pair of driver rollers.

8. The apparatus of claim 1 further comprising a wiper that removes debris from the outer surface of the pipe as the pipe is moved between its upper and lower positions.

9. The apparatus of claim 8 wherein the upper comprises a pair of spaced apart wiper members that are positioned on the frame.

10. An apparatus for placing geophones beneath the surface of the earth, comprising:
   a) a machine frame;
   b) an elongated probe rod dimensioned to reach a selected subterranean earth layer, the rod having an upper end, a lower end, and a smooth uninterrupted outer surface;
   c) a geophone holder positioned at the lower end of the rod;
   d) a plurality of drive wheels carried by the frame for transporting the rod between upper and lower positions, including at least a pair of opposed wheels for frictionally gripping the smooth rod outer surface;
   e) each drive wheel having a smooth annular groove that is generally U-shaped in transverse cross section for closely conforming to the probe rod;
   f) a gear train for interconnecting and driving the wheels so that all of the wheels rotate at the same rotational speed;
   g) a pusher that applies lateral pressure to at least one of the wheels of the pair of opposed wheels, the pusher being adjustable so that lateral pressure applied by the wheels to the probe rod can be varied.

11. An apparatus for placing dynamite beneath the surface of the earth, comprising:
   a) a machine frame;
   b) an elongated probe rod dimensioned to reach a selected subterranean earth layer to form a borehole with a lower end portion, the rod having an upper and lower end;
   c) a dynamite holder positioned at the lower end of the rod;
   d) a plurality of drive wheels carried by the frame for transporting the rod between upper and lower positions, including at least a pair of opposed wheels for frictionally gripping the rod outer surface;
   e) a gear train for interconnecting and driving the wheels so that all of the wheels rotate at the same rotational speed;
   f) a pusher that applies lateral pressure to at least one of the wheels of the pair of opposed wheels; and
   g) wherein the dynamite holder includes a disconnectable portion that enables a dynamite charge to be deposited at the lower end of the borehole when the rod is withdrawn from the borehole.

12. The apparatus of claim 11 wherein there are two pairs of opposed drive rollers.

13. The apparatus of claim 12 wherein the two pairs of opposed drive rollers include an upper pair of drive rollers and a lower pair of drive rollers.

14. The apparatus of claim 13 wherein the drive rollers have annular grooves that conform generally to the outer surface of the rod.

15. The apparatus of claim 13 wherein the gear train comprises a pair of upper gears, a pair of lower gears and a pair of intermediate gears positioned in between the pair of upper gears and the pair of lower gears.

16. The apparatus of claim 15 wherein the pair of upper gears are connected for rotation to the upper pair of driver rollers.

17. The apparatus of claim 15 wherein the pair of lower gears are connected for rotation to the lower pair of driver rollers.

18. The apparatus of claim 11 further comprising a wiper that removes debris from the outer surface of the pipe as the pipe is moved between its upper and lower positions.

19. The apparatus of claim 18 wherein the upper comprises a pair of spaced apart wiper members that are positioned on the frame.

20. The apparatus of claim 18 wherein the rod has a rod bore and a jetting tip, and further comprising a fluid source for supplying fluid under pressure to the jetting tip via the rod bore.

21. An apparatus for placing dynamite beneath the surface of the earth, comprising:

a) a machine frame;

b) an elongated probe rod dimensioned to reach a selected subterranean earth layer to form a borehole with a lower end portion, the rod having an upper and lower end;

c) a dynamite holder positioned at the lower end of the rod;

d) a plurality of drive wheels carried by the frame for transporting the rod between upper and lower positions, including at least a pair of opposed wheels for frictionally gripping the rod outer surface;

e) a gear train for interconnecting and driving the wheels so that all of the wheels rotate at the same rotational speed;

f) a pusher that applies lateral pressure to at least one of the wheels of the pair of opposed wheels;

g) wherein the dynamite holder includes a disconnectable portion that enables a dynamite charge to be deposited at the lower end of the borehole when the rod is withdrawn from the borehole; and h) fluid supply jetting means for supplying fluid under pressure to the rod bore at the rod lower end portion to enable the rod to jet at the rod lower end portion when forming a borehole.

22. The apparatus of claim 1 wherein the rod has a rod bore and a jetting tip, and further comprising a fluid source for supplying fluid under pressure to the jetting tip via the rod bore.

23. The apparatus of claim 10 wherein the rod has a jetting tip portion and further comprising a fluid source for supplying fluid under pressure to the jetting tip.

* * * * *